(12) United States Patent
Cote et al.

(10) Patent No.: US 7,605,708 B2
(45) Date of Patent: Oct. 20, 2009

(54) SMART CORRUGATED CARDBOARD

(75) Inventors: Andre Cote, Williamstown, NJ (US); Luis Francisco Soler Bonnin, Guanica, PR (US)

(73) Assignee: Checkpoint Systems, Inc., Thorofare, NJ (US)

( * ) Notice: Subject to any disclaimer, the term of this patent is extended or adjusted under 35 U.S.C. 154(b) by 315 days.

(21) Appl. No.: 11/614,475

(22) Filed: Dec. 21, 2006

(65) Prior Publication Data
US 2007/0146143 A1 Jun. 28, 2007

Related U.S. Application Data

(60) Provisional application No. 60/753,241, filed on Dec. 22, 2005, provisional application No. 60/781,089, filed on Mar. 10, 2006.

(51) Int. Cl.
G08B 13/14 (2006.01)
(52) U.S. Cl. .................. 340/572.8; 340/568.1; 340/551; 340/572.7
(58) Field of Classification Search ... 340/572.1–572.9, 340/571, 568.1, 541, 551; 156/47, 50, 60, 156/250, 51, 52; 174/102 D, 108, 109
See application file for complete search history.

(56) References Cited

U.S. PATENT DOCUMENTS

| 3,844,315 | A | * | 10/1974 | Williams ..................... 138/140 |
| 4,567,473 | A | | 1/1986 | Lichtblau |
| 4,658,264 | A | | 4/1987 | Baker |
| 4,684,020 | A | * | 8/1987 | Ohlbach ..................... 206/721 |
| 4,835,524 | A | | 5/1989 | Lamond et al. |
| 5,108,822 | A | | 4/1992 | Imaichi et al. |
| 5,172,461 | A | | 12/1992 | Pichl |
| 5,566,441 | A | | 10/1996 | Marsh et al. |
| 5,637,377 | A | * | 6/1997 | Vermillion ................... 428/182 |

(Continued)

FOREIGN PATENT DOCUMENTS

DE 4439914 11/1994

(Continued)

OTHER PUBLICATIONS

International Search Report for corresponding international application PCT/US2006/062570, dated Mar. 5, 2008.

(Continued)

Primary Examiner—Benjamin C Lee
Assistant Examiner—Daniel Previl
(74) Attorney, Agent, or Firm—Caesar, Rivise, Bernstein, Cohen & Pokotilow, Ltd.

(57) ABSTRACT

A communication-ready corrugated article and method for making the corrugated article is disclosed. The corrugated article includes a linersheet (e.g., craft paper), an undulating medium (e.g., craft paper), a conductive strip (e.g., metal, aluminum, wire, coil), and a security chip (e.g., RFID chip, EAS chip, integrated circuit, chip strap, RFID tag, EAS tag). The linersheet has a first side and a second side. The undulating medium is coupled to the first side of the linersheet, the conductive strip is positioned on the first side of the linersheet between the linersheet and the undulating medium. The security chip is attached to the second side of the linersheet opposite the conductive strip and is coupled to the conductive strip through the linersheet.

20 Claims, 9 Drawing Sheets

U.S. PATENT DOCUMENTS

| | | | |
|---|---|---|---|
| 6,100,804 A | 8/2000 | Brady et al. | |
| 6,147,662 A | 11/2000 | Grabau et al. | |
| 6,181,287 B1 | 1/2001 | Beigel | |
| 6,481,631 B1 | 11/2002 | Poustis | |
| 6,665,193 B1 | 12/2003 | Chung et al. | |
| 6,667,092 B1 * | 12/2003 | Brollier et al. | 428/182 |
| 6,940,408 B2 | 9/2005 | Ferguson et al. | |
| 6,988,666 B2 | 1/2006 | Appalucci et al. | |
| 7,436,305 B2 * | 10/2008 | Clare et al. | 340/572.1 |
| 7,466,233 B2 * | 12/2008 | Drapala et al. | 340/572.1 |
| 2002/0195228 A1 * | 12/2002 | Corti et al. | 165/80.3 |
| 2007/0018824 A1 | 1/2007 | Clare et al. | |

FOREIGN PATENT DOCUMENTS

| | | |
|---|---|---|
| JP | 2002308257 | 10/2002 |
| WO | 98/40930 | 9/1998 |
| WO | 9931626 | 6/1999 |
| WO | 2004029872 | 4/2004 |

OTHER PUBLICATIONS

Office Action for corresponding European Application No. 06849338.6, dated Nov. 24, 2008.

* cited by examiner

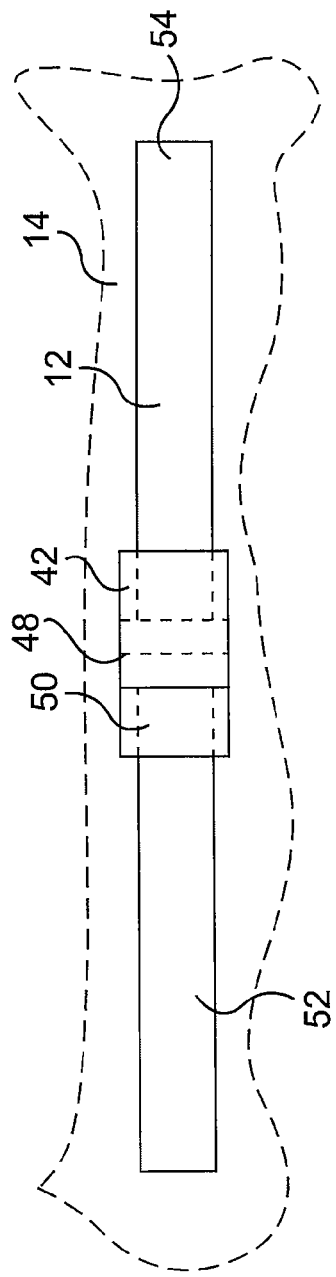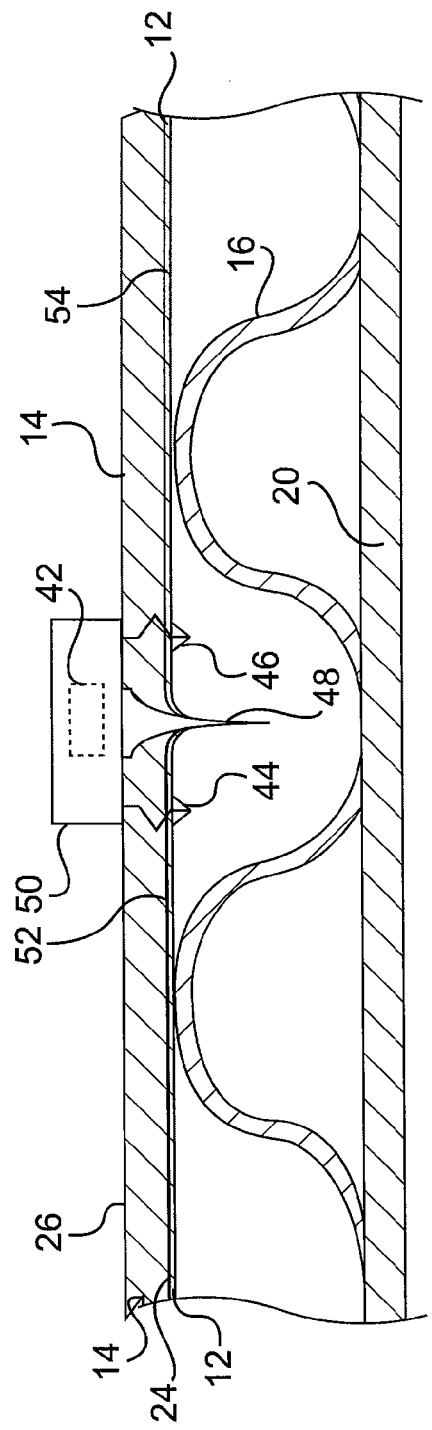

SMART CORRUGATED CARDBOARD

CROSS-REFERENCE TO RELATED APPLICATIONS

This utility application claims the benefit under 35 U.S.C. §119(e) of Provisional Application Ser. No. 60/753,241 filed on Dec. 22, 2005 and Provisional Application Ser. No. 60/781,089 filed on Mar. 10, 2006, both entitled SMART CORRUGATED CARDBOARD and whose entire disclosures are incorporated by reference herein.

BACKGROUND OF THE INVENTION

1. Field of Invention

The current invention relates to security tags and more particularly, discloses an approach for incorporating EAS or RFID components into corrugated structures on which a capacitor strap, a chip strap, or an RFID chip can be electrically coupled to form the EAS or RFID security tag.

2. Description of Related Art

Tracking or detecting the presence or removal of retail items from an inventory or retail establishment comes under the venue of electronic article surveillance (EAS), which also now includes radio frequency identification (RFID). EAS or RFID detection is typically achieved by applying an EAS or RFID security tag to the item or its packaging and when these security tags are exposed to a predetermined electromagnetic field (e.g., pedestals located at a retail establishment exit), they activate to provide some type of alert and/or supply data to a receiver or other detector.

However, the application of the EAS or RFID security tag to the item or its packaging in the first instance can be expensive and wasteful of resources used to form the security tag. For example, EAS security tags, typically comprise a resonant circuit that utilize at least one coil and at least one capacitor that operate to resonate when exposed to a predetermined electromagnetic field (e.g., 8.2 MHz) to which the EAS tag is exposed. By way of example only, the coil and the capacitor are etched on a substrate whereby a multi-turn conductive trace (thereby forming the coil) terminates in a conductive trace pad which forms one plate of the capacitor. On the opposite side of the substrate another conductive trace pad is etched to form the second capacitor plate, while an electrical connection is made through the substrate from this second plate to the other end of the coil on the first side of the substrate. The non-conductive substrate then acts as a dielectric between the two conductive trace pads to form the capacitor. Thus, a resonant circuit is formed. Various different resonant tag products are commercially available and described in issued patents, for example, U.S. Pat. Nos. 5,172,461; 5,108,822; 4,835,524; 4,658,264; and 4,567,473 all describe and disclose electrical surveillance tag structures.

With particular regard to radio frequency identification (RFID) tags, RFID tags include an integrated circuit (IC) coupled to a resonant circuit as mentioned previously or coupled to an antenna (e.g., a dipole) which emits an information signal in response to a predetermined electromagnetic field (e.g., 13.56 MHz). Recently, the attachment of the IC has been accomplished by electrically-coupling conductive flanges or strips to respective IC contacts to form a "chip strap." This chip strap is then electrically coupled to the resonant circuit or antenna. See for example U.S. Pat. No. 6,940,408 (Ferguson, et al.); U.S. Pat. No. 6,665,193 (Chung, et al.); U.S. Pat. No. 6,181,287 (Beigel); and U.S. Pat. No. 6,100,804 (Brady, et al.).

Security systems commonly operate at the pallet and carton levels by reading RFID and EAS tags placed on the pallets or cartons. Accordingly, the industry has sought ways to attach the tags to cartons by placing the tags outside or inside the carton. U.S. Pat. No. 6,667,092 discloses a corrugated structure having a first and second liner board with a corrugated medium sandwiched between the first and second liner boards and an RFID processor coupled between one of the liner boards and the corrugated medium. The RF processor is positioned on an inlet or label, which may also include an antenna. The corrugated structure is formed by providing a liner board in a corrugated medium, positioning an RF processor between the liner board and the corrugated medium, and affixing the liner board and corrugated medium together with the RF processor positioned therebetween. However, placing an RF processor between one of the liner boards and the corrugated medium adds stress to delicate RFID chips during the processing of the RFID-enabled corrugated structure. In addition, since the chips must be inserted into the corrugated structure before the boxes are formed, the location of the chips must be coordinated with the size of the boxes so as to ensure that each box receives its intended chip. There remains a need for efficiently providing or integrating a security tag with a corrugated structure that is reliable and effective.

Another approach for placing an RF structure on a corrugated structure is disclosed in pending U.S. patent application Ser. No. 11/457,890, entitled "RFID TAGS FOR PALLETS AND CARTONS AND SYSTEM FOR ATTACHING SAME", invented by Thomas Clare and Andre Cote, which discloses a multi-step approach for installing an RFID tag onto a shipping article. The approach includes the steps of applying a conductive strip to the surface of a shipping article and attaching an RFID chip to the conductive strip. To prevent a short in the RFID chip, the chip includes a nonconductive fin extending from the body of the chip and adapted to create a gap in the conductive strip between conductive bumps or barbs in the chip by puncturing through and splitting the conductive strip on opposite sides of the fin. It would still be beneficial to provide other approaches for integrating security tags with corrugated structures. All references cited herein are incorporated herein by reference in their entireties.

BRIEF SUMMARY OF THE INVENTION

A method for making a communication-ready corrugated article is provided, which includes providing a linersheet (e.g, craft paper), an undulating medium (e.g., undulating craft paper), and a conductive strip (e.g., metal, aluminum, wire), positioning the conductive strip between the linersheet and the undulating medium, affixing the linersheet and the undulating medium together with the conductive strip positioned therebetween to form a corrugated structure, and coupling a security chip (e.g., RFID, EAS, IC, chip strap, RFID tag, EAS tag) to the conductive strip opposite the linersheet. The step of coupling the security chip to the conductive strip may include stapling the security chip to the conductive strip. Moreover, the step of coupling the security chip to the conductive strip may include attaching a label to the linersheet, with the label housing the security chip (e.g., IC, EAS or RFID circuit attached to a dipole). The method may also include providing a second linersheet (e.g., craft paper) and affixing the second linersheet to the undulating medium opposite the linersheet. In addition, the method may include constructing the article into a shipping container.

In another preferred embodiment of the invention, a communication-ready corrugated article includes a linersheet (e.g., craft paper), an undulating medium (e.g., undulating craft paper), a conductive strip (e.g., metal, aluminum, wire, coil), and a security chip (e.g., RFID chip, EAS chip, integrated circuit, chip strap, RFID tag, EAS tag). The linersheet has a first side and a second side. The undulating medium is coupled to the first side of the linersheet, the conductive strip is positioned on the first side of the linersheet between the linersheet and the undulating medium. The security chip is attached to the second side of the linersheet opposite the conductive strip and is coupled to the conductive strip through the linersheet. In one approach, the conductive strip has a width; and the security chip includes a body, a first conductive member, a second conductive member and a nonconductive fin therebetween. The nonconductive fin has a width at least as wide as the width of the conductive strip and extends from the body through the linersheet and severs the nonconductive strip into a first strip portion and a second strip portion, with the first conductive member being electrically coupled to the first strip portion and the second conductive member being electrically coupled to the second strip portion. The first conductive member may also have a first conductive barb extending from the body through the linersheet and first strip portion for receipt by the first strip portion, and the second conductive member may have a second conductive barb extending from the body through the linersheet and second strip portion for receipt by the second strip portion.

In another approach, the security chip may include an IC circuit attached to a dipole that is capacitively coupled to the conductive strip. The communication-ready corrugated article may also include a second linersheet coupled to the undulating medium opposite the first linersheet, and the corrugated article may be a shipping container.

BRIEF DESCRIPTION OF SEVERAL VIEWS OF THE DRAWINGS

The invention will be described in conjunction with the following drawings in which like reference numerals designate like elements, and wherein:

FIG. 8 is a top view of the RFID tag of FIG. 7 mounted on a corrugated structure of the preferred embodiments;

FIG. 9 is a partial cross-sectional view of the RFID tag of FIG. 7 mounted on a corrugated structure of the preferred embodiments;

DETAILED DESCRIPTION OF THE PREFERRED EMBODIMENTS

The invention will be illustrated in more detail with reference to the following embodiments, but it should be understood that the present invention is not deemed to be limited thereto. The embodiments disclosed below generally include an approach for a corrugated article (e.g., cardboard, flat and undulating layers of craft paper) with an antenna (e.g., conductive strip) held within layers of the corrugated article and in conductive communication with a security chip. The corrugated article is produced from a known assembly process and embeds an antenna within the corrugated article, preferably during the assembly process as set forth in greater detail below.

Figure 1:
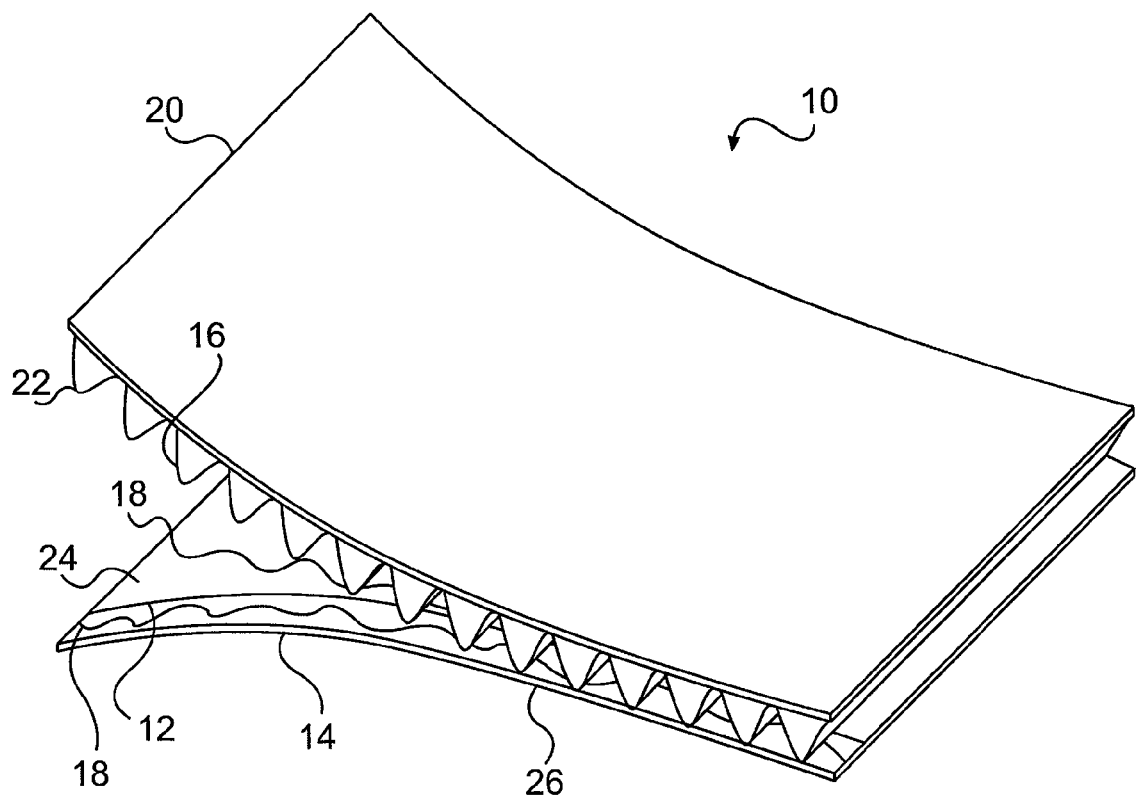
FIG. 1 is a perspective view of a corrugated structure according to the preferred embodiments showing an antenna positioned within the corrugated structure.

FIG. 1 depicts a communication-ready corrugated article 10 having an antenna 12 embedded within the body of the corrugated article. The antenna 12 is preferably a strip of conductive material, for example, an elongated foil strip capable of being held within the corrugated article 10. The corrugated article 10 may be formed into, for example, a box or carton such as a corrugated cardboard carton or box (e.g., constructed from craft paper and glue). As such, the corrugated article 10 includes a first linersheet 14, a second linersheet 20, and an undulating medium 16 sandwiched therebetween. The undulating medium 16 is attached to the linersheets 14, 20 by an adhesive 18. Each of the linersheets 14, 20 and the undulating medium are preferably made of craft paper. The first linersheet 14 has a first side 24 and a second side 26 opposite the first side.

The antenna 12 is embedded in the corrugated article 10 during the manufacture of the corrugated article, for example, by positioning the antenna on the first side 24 (e.g., interior side) of the linersheet 14. The antenna 12 may be adhered to the linersheet 14 with an adhesive, although an adhesive between the antenna and the linersheet is not necessary. Corrugated structures, such as cardboard, are traditionally constructed by applying strips of the adhesive 18 (e.g., glue) between the linersheets 14, 20 and the undulating medium 16 positioned therebetween. Without being limited to a particular theory, the antenna 12 may be fixed between the linersheet 14 and the undulating medium 16 by placing the antenna 12 on the linersheet adjacent strips of the adhesive 18 before the undulating medium 16 is attached to the linersheet 14. In this manner, the antenna 12 is embedded in the corrugated article 10 and fixed in position between strips of adhesive 18 that hold the linersheet 14 and undulating medium 16 together about the antenna. Because the antenna 12 is hidden within the corrugated article 10, it is not easily removed from the article and is difficult to locate without an added indicia, as will be described in greater detail below. The corrugated article 10 also helps to protect the antenna 12 from damage from external forces that are applied to the article during transport.

Figure 2:
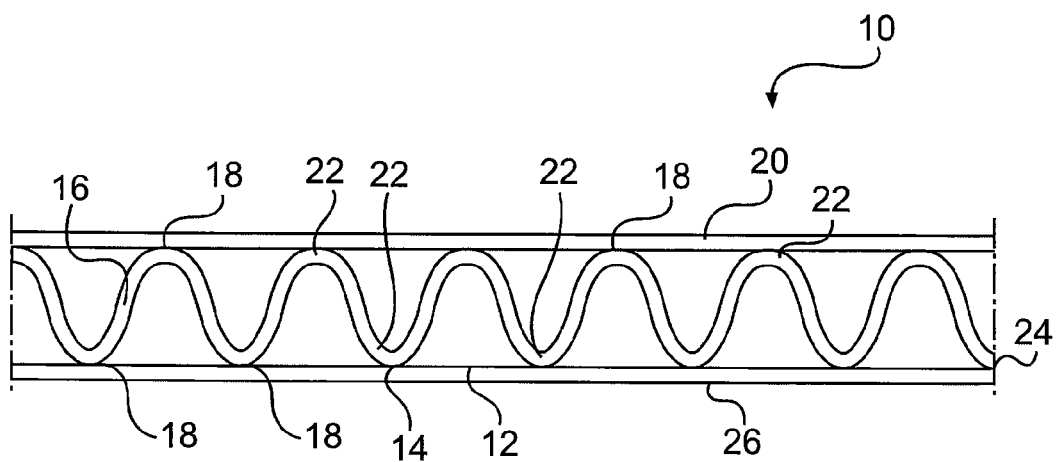
FIG. 2 is a partial side sectional view of the corrugated structure of FIG. 1.

FIG. 2 depicts the antenna 12 embedded within the corrugated article 10. While the adhesive 18 in FIG. 1 is shown applied to the linersheet 14, which is then attached to the undulating medium 16, as an alternative, FIG. 2 shows the adhesive generally applied to the apexes 22 of the individual undulations (e.g., flutes) of the undulating medium 16. Under either approach, the adhesive 18 adheres the undulating medium 16 to the linersheets 14, 20, and also assists in adhering the antenna 12 in position within the corrugated article 10. While not being limited to a particular theory, the antenna 12 is flexible, so that it may withstand the bending forces that are applied during the assembly process into the corrugated article 10, and eventually preferably a shipping container.

Figure 3:
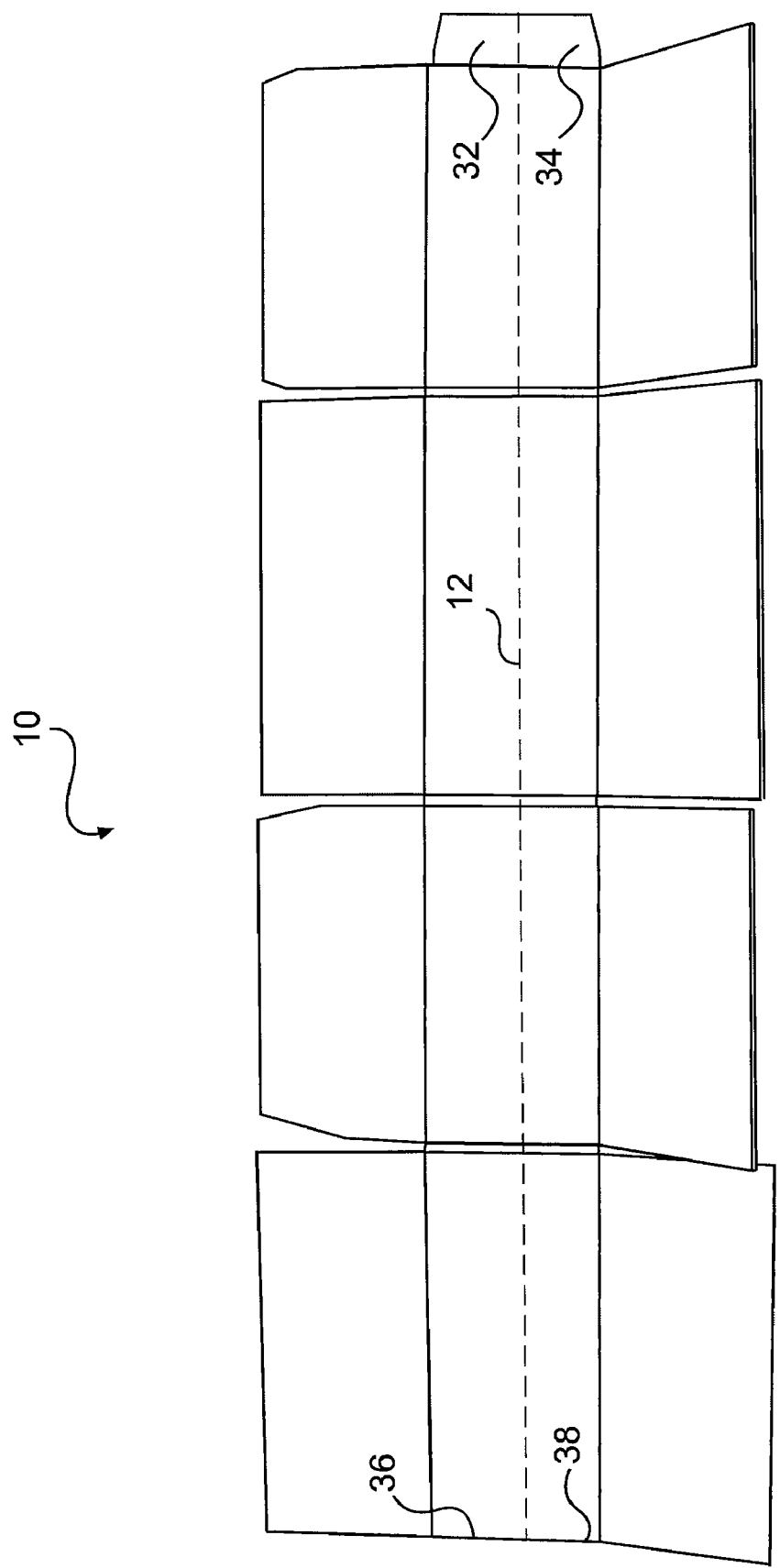
FIG. 3 is a top view partially in section of a corrugated structure in accordance with the preferred embodiments.

FIG. 3 shows the communication ready corrugated article 10 adapted to be folded into a shipping container 30. Embedded in the corrugated article 10 is an antenna 12 that is shown extending the length of the corrugated article 10 so that when the corrugated article is folded into a shipping container, the antenna partially encircles itself to form a loop antenna and further increase its effectiveness. It should be noted that the antenna 12 is not limited to having a length substantially equal to the length to the corrugated article 10, as the antenna may be a different length depending on the needs and requirements of the security system used to communicate with a tag coupled with the antenna 12, as discussed in greater detail below.

Figure 4:
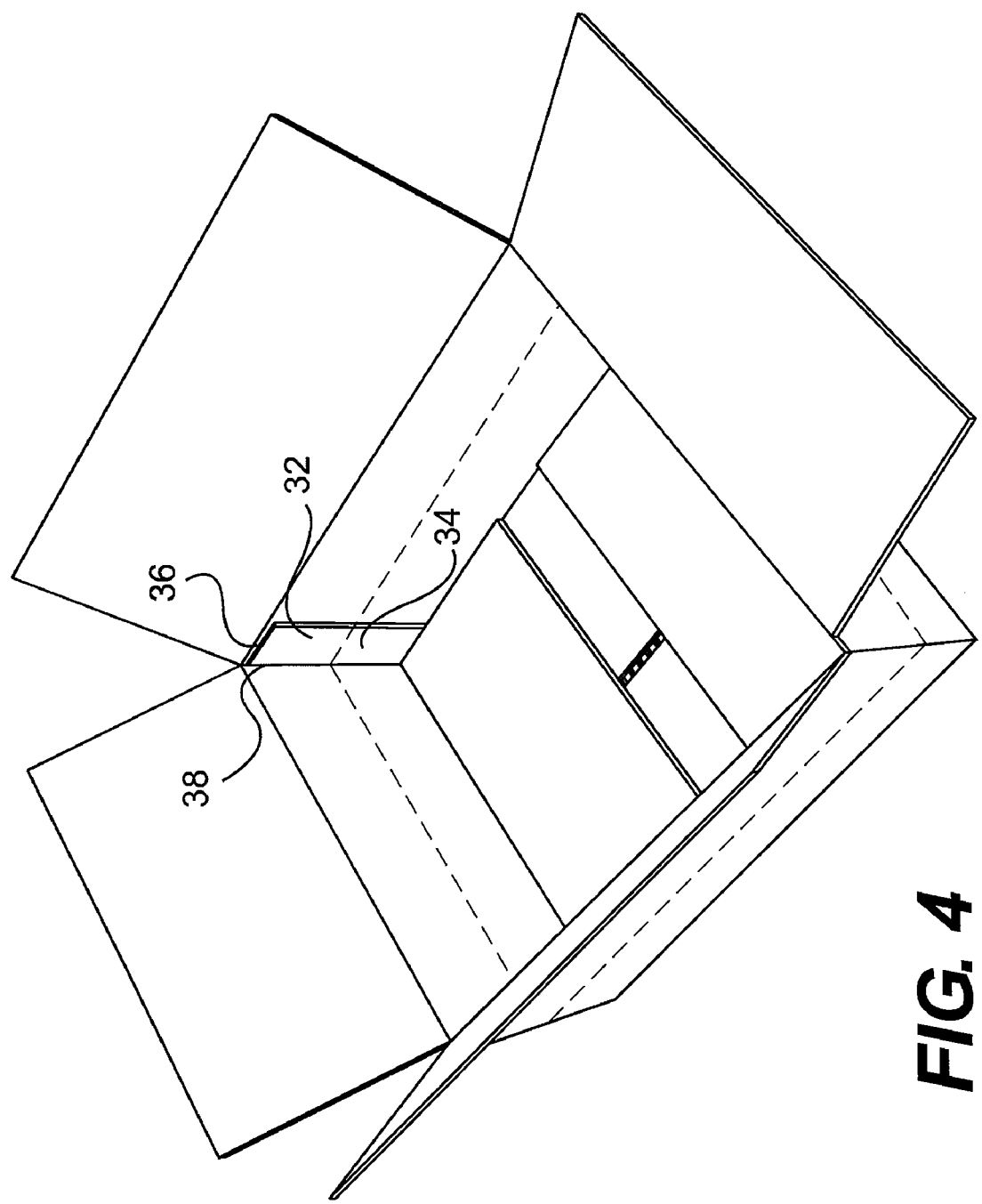
FIG. 4 is a perspective view of the corrugated structure of FIG. 3. folded into a shipping container.

FIG. 4 depicts the shipping article 30 formed by the corrugated article 10. As can be seen in FIG. 4, the shipping container 30 is made by folding the corrugated article 10 using various processes as well known in the art. Referring back to FIG. 3, the corrugated article 10 includes a flap 32 extending from a first end 34 of the corrugated article. In order to form the shipping container 30, the corrugated article 10 is folded and the flap 32 is typically adhered to a second end 36 of the corrugated article with, for example, an adhesive and staples if needed, to close the side of the shipping container 30. As can best be seen in FIG. 4, when the flap 32 is adhered to the second end 36, the connection of the tag to the second end closes the edge 38 and helps to seal and structurally secure the shipping container.

Figure 5:
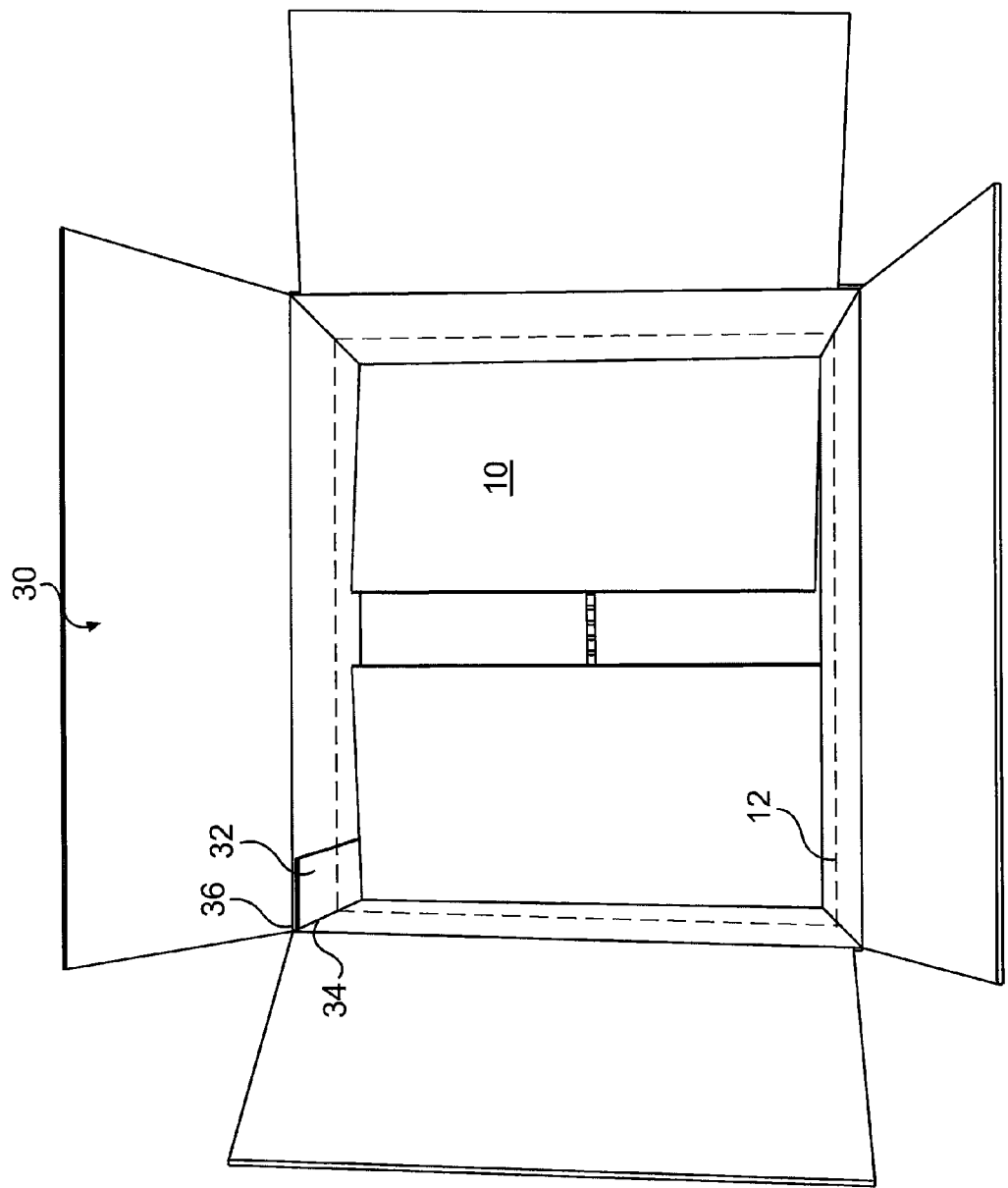
FIG. 5 is a top view partially in section of the shipping container of FIG. 4.

FIG. 5 illustrates atop view partially in section of the shipping container 30 of FIG. 4. As can be see in FIG. 5, the corrugated article 10 is wrapped around and folded to form the shipping container 30. The flap 32 folds under the second end 36 and is sealed to secure the side walls of the shipping container. The antenna 12 folds with the corrugated article 10, but the two ends of the wires do not touch. Instead, the antenna 12 laps under itself separated by the width or thickness of the corrugated article to form a loop antenna.

Figure 6:
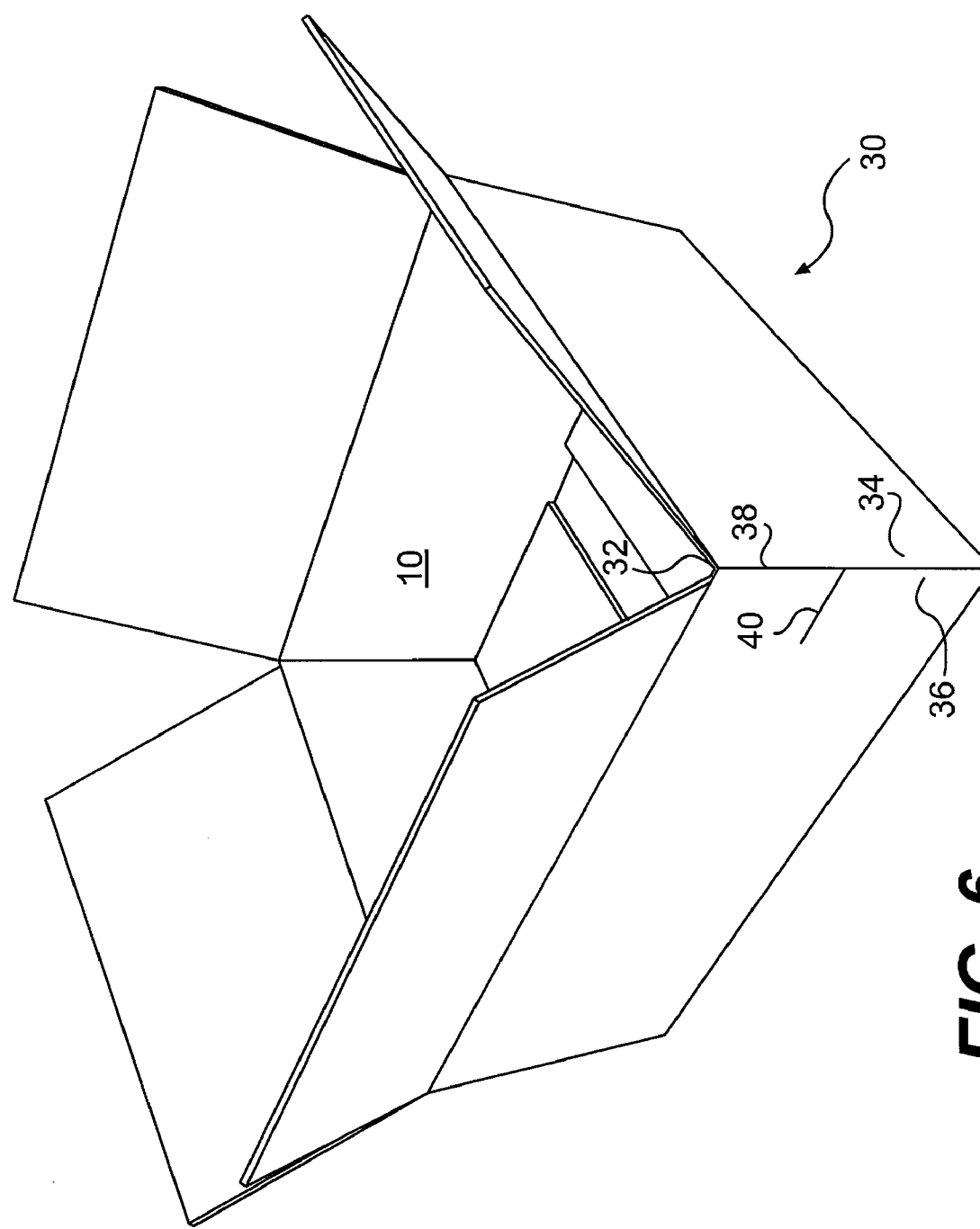
FIG. 6 is an opposite perspective view of the shipping container of FIG. 4 having an indicia of an embedded antenna.

FIG. 6 depicts the shipping container 30 in a perspective view. This view shows the first end 34 and the second end 36 sealed together along the edge 38 with the flap 32 folded inside of the second end. The shipping container 30 also includes an antenna marker 40 on the second side 26 (e.g., outside) of the first linersheet 14 where it can be viewed by a human observer. The antenna marker 40 extends on the second side of the linersheet 14 opposite the antenna 12 as indicia of the antenna's location. Since the antenna 12 is hidden from human sight, as it is embedded in the corrugated article, it is otherwise very difficult to locate the antenna without a metal or detector. Knowing the location of the antenna 12 inside of the corrugated article 10 is important for determining where a security tag should be placed on the shipping container 30 to form a security tag (e.g., RFID tag, EAS tag). In order for the antenna 12 to increase the detectabilty of the security tag, the security tag must be conductively coupled to the antenna.

Once the location of the antenna 12 is known, a chip or strap is placed at the antenna marker 40 and in conductive communication with the antenna. For example, the chip can be placed in physical contact with the antenna through the first linersheet 14, or a chip strap having a dipole that does not have to come into physical contact with the antenna is placed over the antenna. The dipole is preferably placed adjacent to the antenna 12 and capacitively coupled with the antenna through the first linersheet 14. With this construction, the antenna 12 increases the detectability of the chip strap by increasing its sensitivity to read signals and increasing the strength of its modulated or transmitted signal over a chip strap used alone.

Figure 7:
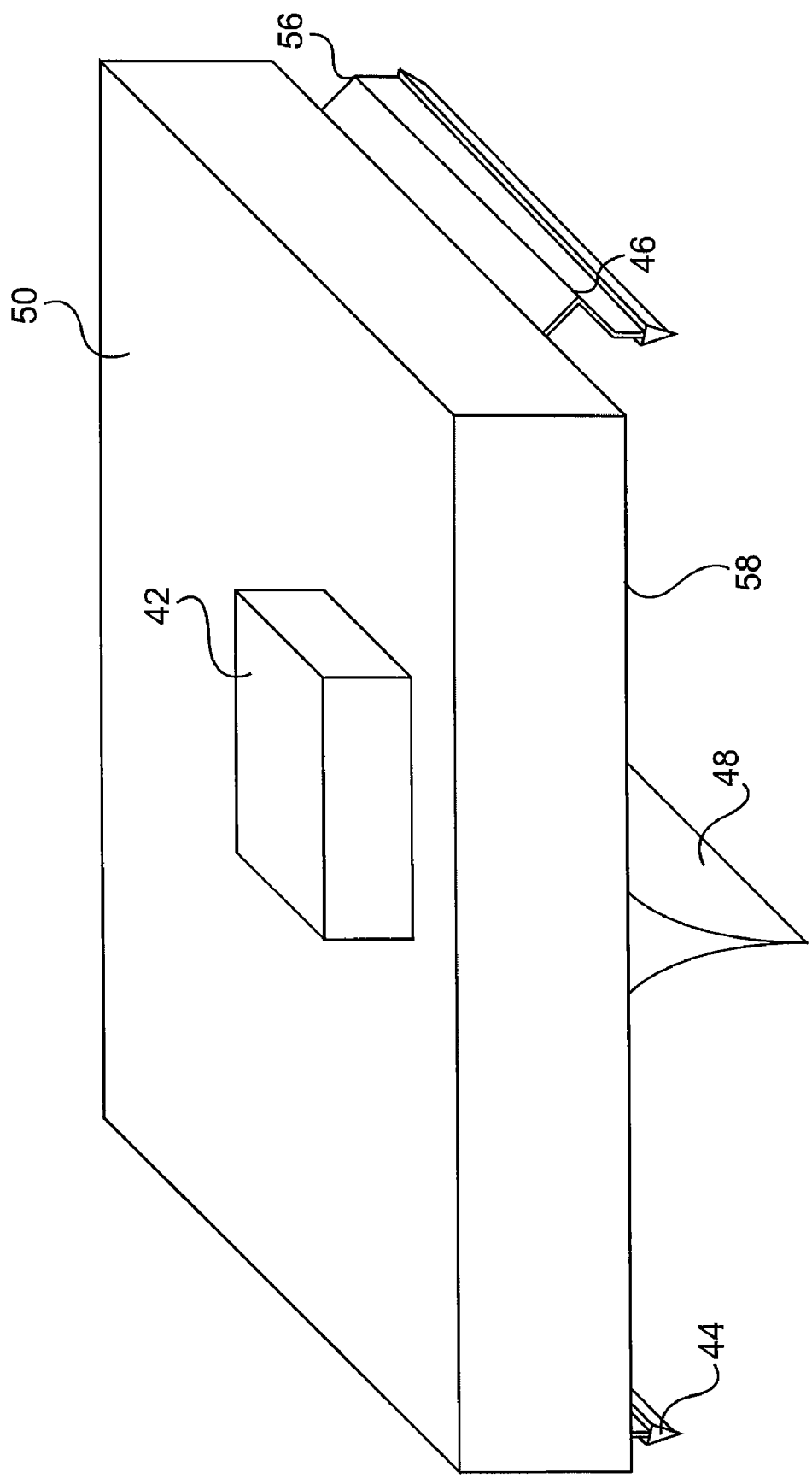
FIG. 7 is a simplified schematic view of an RFID tag attachable to the corrugated structure in accordance with the preferred embodiments.

FIG. 7 depicts an illustrative RFID chip 42 that may be conductively coupled with the antenna 12 to form an RFID tag. The RFID chip 42 has a body 50, a first barb 44, a second barb 46 and a nonconductive fin 48 between the first barb and the second barb. The barbs 44, 46 and the fin 48 extend downwardly from a bottom side 58, the body 50 and, during construction of the RFID tag, pierce the strip of conductive material (antenna 12) such that the chip is fixed in place on the surface (e.g., second side 26) of the corrugated article 10 at the antenna marker 40. In other words, as the RFID chip 42 is positioned over the antenna marker 40 such that the RFID chip is placed over the antenna (e.g., strip of conductive material) and lowered, the nonconductive fin 48 protruding from the bottom of the RFID chip 42 severs the conductive material of the antenna to form two separate portions or strips of an RFID antenna.

FIGS. 8 and 9 depict the RFID chip 42 coupled to the antenna 12. As can best be seen in FIG. 8, the fin 48 has a width that is at least as wide as the width of the antenna 12 to ensure severing. The barbs 44, 46 are not as wide as the width of the antenna 12 so that the barbs pierce but do not sever the antenna when the chip 42 is coupled to the antenna.

The RFID chip 42 is attached to the corrugated article 10 by inserting the chip onto the first linersheet at the antenna marker 40 such that the fin 48 severs the antenna 12 into a first strip 52 and a second strip 54, and such that the first barb 44 is electrically attached to the first strip 52 and the second barb 46 is electrically attached to the second strip 54. While not being limited to a particular theory, the first and second barbs 44, 46 each preferably have a curved portion 56 adjacent the bottom side 58 of the body 50 of the RFID chip 42, as can best be seen in FIG. 7. This provides for attachment of the RFID chip 42 to the shipping container 36 and the antenna 12 with increased security.

Preferably, the RFID chip 42 is encapsulated using a known encapsulation material for increased damage resistance and structural support. This may be accomplished by any of a number of known encapsulation techniques. Of course, the barbs 44, 46 and nonconductive fin 48 protrude from the bottom 58 of the chip regardless of whether the chip is encapsulated. The nonconductive fin 48 may substantially include any known nonconductive material that is hard enough to split the antenna 12, and that would operate to sufficiently isolate the two separate strips 52, 54 of the antenna. For example, the nonconductive fin 48 may be constructed from quartz.

Additional approaches other than barbs may be used to conductively attach the RFID chip 42 to the antenna. For example, a short cone or construction of conductive adhesive that can break through craft paper and attach to the antenna may be used. The result of performing the method of the present invention yields a security tag that is located on a corrugated article 10 such as a shipping container 30. The security tag includes an antenna 12 enclosed in the corrugated article 10 that is conductively or capacitively coupled to a security chip 42 having a body 50, first and second conductive points (e.g., first barb 44, second barb 46, conductive adhesives that may be shaped, for example, as cones, pins, ridges, etc.) and a nonconductive fin 48 between the first and second conductive points. The antenna 12 is preferably a strip of conductive material that can take on many forms. For example, the antenna may be an elongated conductive strip that forms a dipole antenna. Alternatively, this antenna may be in the form of a loop antenna or a coil that forms, for example, a 13.56 MHz antenna.

Figure 10:
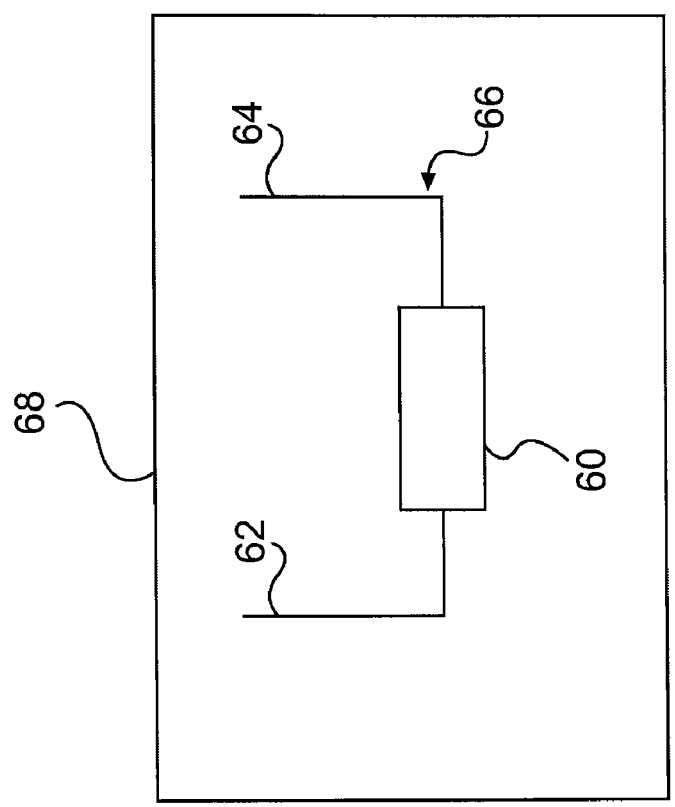
FIG. 10 is a simplified schematic view of an RFID chip strap for use with the corrugated structure.

As an alternative, the security chip may include as its first and second conductive points, areas of conductive material attached to separate strips of conductive material that form a dipole antenna. FIG. 10 depicts such an exemplary security chip 60 (e.g., RFID, EAS) as conductively coupled to separate strips of conductive material 62, 64 that form a dipole antenna 66. A combination of the chip 60 and dipole antenna 66 forms a chip strap 67 that, as shown in FIG. 10, is attached to a label 68. The label 68 includes an adhesive that allows the label to be fixed on the shipping container 30 at the antenna marker 40 where the chip strap 67 is capacitively coupled to the antenna 12 without a requirement for physical contact with the antenna. When capacitively coupled to the antenna 12, the chip strap's range of communication is greatly increased.

While not being limited to a particular theory, the security chip 60 may include an RFID tag having an integrated circuit (IC) coupled to a resonant circuit and/or to an antenna (e.g., a dipole) that emits an information signal in response to a predetermined electromagnetic field (e.g., 13.56 MHz, UHF range: approximately 850 MHz-950 MHz or microwave range: about 2.3 GHz-2.6 GHz). Recently, the attachment of the IC has been accomplished by electrically-coupling conductive terminals (e.g., flanges) to respective IC contacts (e.g., by crimping or adhesive) to form a "chip strap." This chip strap is then electrically coupled to the resonant circuit or antenna. Chip straps are known in the art, such as those shown in U.S. Pat. No. 6,940,408 (Ferguson, et al.); U.S. Pat. No. 6,665,193 (Chung, et al.); U.S. Pat. No. 6,181,287 (Beigel); and U.S. Pat. No. 6,100,804 (Brady, et al.), as well as in U.S. patent application Ser. No. 11/539,995 and all of whose disclosures are incorporated by reference herein.

Figure 11:
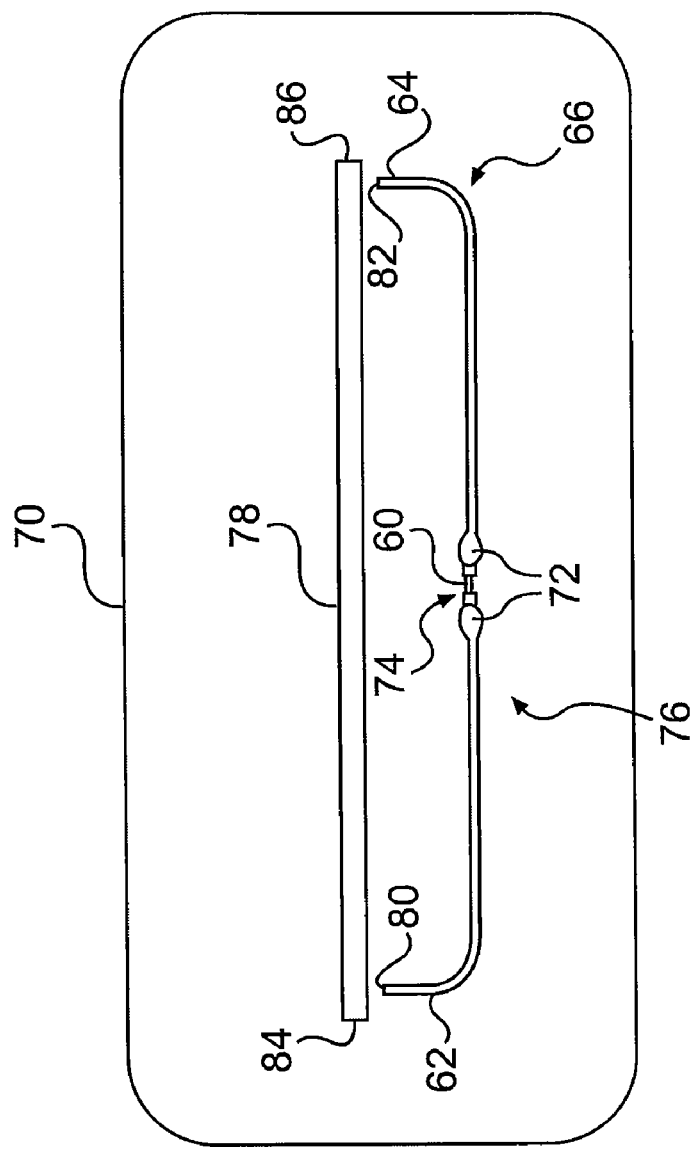
FIG. 11 is a bottom view of a security tag attached to a label in accordance with the preferred embodiments.

FIG. 11 depicts a label 70 that houses an exemplary embodiment of a security tag 76 for use with the antenna 12 fixed in the corrugated article 10 to communicate in the EAS or RFID range. The security tag 76 comprises the security chip 60 bumped onto conductive terminals 72 that together form a chip strap 74. The chip strap 74 is applied across inward facing proximal ends of the conductive strips 62, 64 of the dipole 66, as shown in FIG. 11. The conductive terminals 72 are electrically coupled (e.g., by crimping or adhesive bonding) to the respective conductive strips 62, 64 of the dipole 66 to form a security tag 76.

Still referring to FIG. 11, the security tag 76 also includes a conductive bar 78 preferably formed of metal (e.g., aluminum) that is positioned adjacent the dipole 66. In particular, the conductive bar 78 is a thin conductive strip placed next to but not touching distal ends 80, 82 of the dipole 66. The conductive bar 78 has a first end 84 outside the distal end 80 of strap 62, a second end 86 outside the distal end 82 of strap 64, and extends therebetween in a generally rectangular configuration. While not being limited to a particular theory, the conductive bar 78 provides a benefit of accentuating the signal from the security tag 76 to increase its read and write distances.

As can best be seen in FIG. 11, the security tag 76 and conductive bar 78 are attached to, or housed in, a label 70. The label 70 is significantly similar to the label 68 discussed above. In particular, the label 70 includes an adhesive backing that allows the label to be fixed on the shipping container 30 at the antenna marker 40, where the security tag 76 and conductive bar 78 are capacitively coupled to the embedded antenna 12 without a requirement for physical contact with the antenna. When capacitively coupled to the antenna 12, the range of communication of the security tag 76 is significantly increased. For example, the inventors discovered that the read range of the security tag 76 is unexpectedly increased from about one foot to over 15 feet simply by attaching the label 70 with the security tag 76 and conductive bar 78 within one inch of the antenna 12 fixed in the corrugated article 10.

It is understood that the method and apparatus for making in-mold circuits described herein are exemplary indications of preferred embodiments of the invention, and are given by way of illustration only. In other words, the concept of the present invention may be readily applied to a variety of preferred embodiments, including those disclosed herein. While the invention has been described in detail and with reference to specific examples thereof, it will be apparent to one skilled in the art that various changes and modifications can be made therein without departing from the spirit and scope thereof. For example, the security chips could be placed in conductive communication with the antenna embedded in the corrugated article using an automated process. With this automated process, an antenna marker is not needed as, for example, a metal detector could detect the location of the antenna, and a chip applicator could place the chip based on the metal detector's findings. Alternatively, the antenna's location could be registered so that its location is known for accurate chip placement. Without further elaboration, the foregoing will so fully illustrate the invention that others may, by applying current or future knowledge, readily adapt the same for use under various conditions of service.

What is claimed is:

1. A communication ready corrugated article, comprising:
   a linersheet having a first side and a second side;
   an undulating medium coupled to the first side of said linersheet;
   a conductive strip positioned on the first side of said linersheet between said linersheet and said undulating medium; and
   a security chip attached to the second side of said linersheet opposite said conductive strip and coupled to said conductive strip through said linersheet.

2. The article of claim 1, wherein said conductive strip has a width, and said security chip includes a body, a first conductive member, a second conductive member and a nonconductive fin therebetween, said nonconductive fin having a width at least as wide as the width of said conductive strip and extending from said body through said linersheet and severing said nonconductive strip into a first strip portion and a second strip portion, said first conductive member being electrically coupled to said first strip portion, and said second conductive member being electrically coupled to said second strip portion.

3. The article of claim 2, wherein said first conductive member having a first conductive barb extending from said body through said linersheet and first strip portion for receipt by said first strip portion, said second conductive member having a second conductive barb extending from said body through said linersheet and second strip portion for receipt by said second strip portion.

4. The article of claim 1, said security chip including an integrated circuit attached to a dipole, said dipole capacitively coupled to said conductive strip.

5. The article of claim 4, further comprising a conductive bar adjacent said dipole that is conductively coupled to both said integrated circuit and said conductive strip.

6. The article of claim 1, further comprising a second linersheet coupled to said undulating medium opposite said first side of said linersheet.

7. The article of claim 1, further comprising an antenna marker on the second side of said linersheet as indicia of said conductive strip, and said security chip is attached to the second side of said linersheet on said antenna marker.

8. The article of claim 7, further comprising a label housing said security chip, said label having an adhesive backing for placing said label onto the second side of said linersheet adjacent said conductive strip.

9. The article of claim 8, said security chip including an integrated circuit conductively attached to a dipole, and further comprising a conductive bar adjacent said dipole that is conductively coupled to both said integrated circuit and said conductive strip.

10. A method for making a communication ready corrugated article, comprising:
providing a linersheet and an undulating medium;
providing a conductive strip;
positioning the conductive strip between the linersheet and the undulating medium;
affixing the linersheet and the undulating medium together with the conductive strip positioned therebetween to form a corrugated structure; and
coupling a security chip to the conductive strip opposite the linersheet.

11. The method of claim 10, wherein the step of coupling the security chip to the conductive strip includes stapling the security chip to the conductive strip.

12. The method of claim 10, wherein the step of coupling the security chip to the conductive strip includes attaching a label to the linersheet, the label housing the security chip having an IC circuit attached to a dipole.

13. The method of claim 10, further comprising providing a second linersheet and affixing the second linersheet to the undulating medium opposite the linersheet.

14. The method of claim 10, further comprising constructing the article into a shipping container.

15. The method of claim 10, further comprising providing an antenna marker as indicia for the conductive strip, wherein the step of coupling the security chip to the conductive strip opposite the linersheet includes placing the security chip over the antenna marker.

16. A communication ready corrugated article, comprising:
means for providing a linersheet, an undulating medium and a conductive strip;
means for positioning the conductive strip between the linersheet and the undulating medium;
means for affixing the linersheet and the undulating medium together with the conductive strip positioned therebetween to form a corrugated structure; and
means for coupling a security chip to the conductive strip opposite the linersheet.

17. The article of claim 16, wherein the means for coupling includes means for stapling the security chip to the conductive strip.

18. The article of claim 16, wherein the means for coupling includes means for attaching a label to the linersheet, the label housing the security chip having an IC circuit attached to a dipole.

19. The article of claim 16, further comprising means for providing a second linersheet and means for affixing the second linersheet to the undulating medium opposite the linersheet.

20. The article of claim 16, further comprising means for providing an antenna marker as indicia for the conductive strip, wherein the means for coupling includes means for placing the security chip over the antenna marker.

* * * * *